United States Patent [19]

Hanstein et al.

[11] Patent Number: 4,948,548

[45] Date of Patent: Aug. 14, 1990

[54] METHOD OF FORMING REDUCING FORMATION OF IMPRESSIONS FROM THE FORMING TOOL

[75] Inventors: Friedrich Hanstein, Gross-Zimmern; Karl-Heinz Fehring, Stockstadt/Rh., both of Fed. Rep. of Germany

[73] Assignee: Rohm GmbH Chemische Fabrik, Darmstadt, Fed. Rep. of Germany

[21] Appl. No.: 317,843

[22] Filed: Mar. 2, 1989

[30] Foreign Application Priority Data

Mar. 4, 1988 [DE] Fed. Rep. of Germany ....... 3807040

[51] Int. Cl.$^5$ ............................................. B29C 51/42
[52] U.S. Cl. .................................. 264/522; 264/548; 264/336
[58] Field of Search ............................... 264/519–522, 264/544, 547, 548, 336

[56] References Cited

U.S. PATENT DOCUMENTS 4,584,157  4/1986  Sweig ................................... 264/522
4,704,081  11/1987 Puehler ............................. 264/550

*Primary Examiner*—Jill L. Heitbrink
*Attorney, Agent, or Firm*—Oblon, Spivak, McClelland, Maier & Neustadt

[57] ABSTRACT

In forming operations on plastic sheets, plates, strips, or tubes (particularly, having highly glossy surfaces) by molding or forming tools, the surface qualities, particularly the gloss, remains undamaged if; (a) the tool is maintained at a temperature in the thermoelastic state region of the plastic until disengagement of the plastic from the tool; and (b) the formed plastic is cooled at its rear side to below the softening temperature, and is disengaged from the forming tool while said tool is hot.

12 Claims, No Drawings

METHOD OF FORMING REDUCING FORMATION OF IMPRESSIONS FROM THE FORMING TOOL

BACKGROUND OF THE INVENTION

1. Field of the Invention

The invention relates to a method of forming or performing secondary forming operations (hereinafter simply called "forming") on plastic films, sheets, plates, strips, or tubes (hereinafter called "sheets or the like") in the thermoelastic state by means of a heated molding or forming tool with high thermal conductivity. In the thermoelastic state, plastic sheets or the like and tubes can be formed in numerous ways, by bending, stretching, bowing, or blowing. The shapes obtained by forming are durably "frozen in" by cooling the material to below the softening temperature.

2. Discussion of the Background

The techniques of industrial forming are set forth in detail in Vieweg, R., and Esser, F., 1975, "Polymethacrylate" Vol. IX, pub. in Munich, pp. 550-573. Forming tools may be used for forming by blowing, vacuum forming, or stretching. They may be fabricated from wood materials, and are coated with a so-called "glove material" in order to avoid making impressions on the plastic undergoing forming (see *ibid.* p. 550). The low thermal conductivity of the wood is advantageous (p. 550). For large serial production, metal tools are preferred. These are coated with heat-resistant paints or molded resins, in order to improve their surface qualities and to provide thermal insulation (pp. 551 and 564). Polishing the metal surface to a high gloss does not result in preservation of the surface smoothness of the plastic during the forming, and in fact leads to pitting. It is preferable if the surface has a satin or matte finish (p. 551).

It is known to heat the surface of metal tools by means of heating elements incorporated in the tool (p. 551). For example, tools for blow mold forming and vacuum mold forming of acrylic glass substitutes are heated to 60°-80° C., in order to prevent cooling of the material (p. 564). For stretching acrylic glass substitutes by means of a drawing punch, it is recommended that the punch be manufactured of a material which is a good heat conductor and that the punch be heated to a high temperature, e.g. 80°-110° C. (p. 566), in order to avoid premature cooling of the plastic. The use of a relatively hot tool makes it possible to substantially, but not completely, avoid cooling streaks (p. 567). Heated metal tools also aid in avoiding stress formation in the formed piece due to nonuniform cooling (p. 568).

In all the known forming methods, even where heated tools are employed, the formed piece is essentially only disengaged from the forming tool after it has been completely cooled to a temperature below the softening temperature. Experience has shown that despite all the abovementioned precautionary measures, it is not possible to completely avoid impressions of the forming tool on the surface of the plastic. In particular, surfaces of high smoothness, such as are characteristic of sheets of acrylic glass substitutes, are readily damaged by even minor impressions, so that they look unattractive. The same applies to fine matte surfaces.

In order to avoid these problems in forming operations on thermoelastically softened plastic sheets or the like and in order to obtain a gloss, forming tools with a rigid body are used according to U.S. Pat. No. 4,704,081 and Eur. OS No. 201 044. The tools are coated with an elastic layer having a smooth, closed, matte surface of higher elasticity than that of the softened plastic sheet. In this case the forces active between the surface of the tool and the plastic result preferentially in deformation of the tool surface rather than the surface of the plastic. However, it is difficult to manufacture such tools if they are to have spherically curved surfaces.

SUMMARY OF THE INVENTION

Accordingly, one object of the present invention is a process for forming operations on sheets, tubes, or the like which are comprised of plastic in a thermoelastic state, by means of a heated forming tool with a high thermal conductivity, which reduces or eliminates the formation of impressions from the forming tool.

It has been discovered, in connection with the present invention, that this problem is solved if the forming tool is employed at a temperature which is in the thermoelastic region of the plastic, wherewith the plastic which has undergone forming is cooled on its rear side to below the softening temperature until it is shape-retentive and is disengaged from the hot forming tool while the temperature of said tool is in the thermoelastic temperature region.

Whereas the known methods aim at suppressing heat transfer between the thermoelastically softened plastic and the forming tool by means of a thermally insulating tool surface and a low temperature difference between the plastic and the tool, the inventive method in fact depends on the attainment of the proper heat transfer.

DETAILED DESCRIPTION OF THE PREFERRED EMBODIMENTS

The invention is based on maintaining the surface of the plastic, which contacts the forming tool, in a thermoelastic state up to the instant of disengagement, so that any deformations of the plastic surface are reversed immediately by elastic restoration when the tool surface is separated from the workpiece. At the time of disengagement, a steep temperature gradient exists in the wall of the formed plastic body. Whereas the rear side of the plastic body, i.e., the side distant from the forming tool, is being cooled to a temperature sufficiently below the softening temperature, so that the formed body no longer yields to the elastic restoration forces of the material, i.e. the formed body is shape retentive, the temperature increases in the direction toward the surface contacting the hot tool, to a temperature in the thermoelastic region.

The temperature gradient may be limited to a region of depth which is near the surface of the plastic which contacts the tool. Because the surface disturbances attributable to contact of the tool are limited to a boundary region only a few microns thick, it is sufficient if this region is maintained in the thermoelastic state until the time of disengagement from the tool. The material may be below the softening temperature at locations just a few microns (about 1-10 microns) from the boundary surface. This is also advantageous from the standpoint of shape stability and the avoidance of internal stresses; in the case of forming operations on thin sheets (in the thickness range of films) it is a necessity.

The required steep temperature gradient is brought about by cooling the formed plastic on its rear or opposing side (the second surface), with the heat loss at the surface contacting the tool (the first surface) being continuously compensated by the heat supplied from the tool. This presupposes high thermal conductivity of the tool material, since otherwise there would be a hazard that contact locations between the tool surface and the opposing plastic surface could be cooled to below the softening temperature. This would cause the surface disturbances to be "frozen in", and the inventive effect would not be achieved.

Accordingly, the thermoelastic state of the plastic surface is an essential requirement of the inventive method. The thermoelastic state region is a characteristic of the plastic material used. This state is characterized by reversible elastic behavior of the plastic in the face of deforming forces. When the deformation force is removed, the plastic reassumes its original configuration which it had prior to the application of the force. See Vieweg and Esser, loc. cit., 88–97 and 541. Thus, in the inventive method, the plastic surface, which is deformed by irregularities in the tool surface or dust particles or gas bubbles, is restored elastically when the tool is disengaged, thus rendering the deformation reversible and returning the plastic to its original smooth state.

In order to effect the inventive method, the temperature region of the thermoelastic state must be accurately known for the plastic being processed. This information can be acquired by constructing a stress/strain diagram in known fashion. The thermoelastic region starts at the softening temperature, and for many plastics it undergoes a transition with increasing temperature into a thermoplastic state extending over a more or less broad temperature interval. The thermoplastic state (as distinguished from the thermoelastic state) is characterized in that changes in shape under the action of deforming forces are irreversible, i.e. the plastic retains the changed shape even when the deforming force is removed or disappears. In the transition region between the thermoelastic and the thermoplastic state, changes in shape are only partially elastically reversible. The plastic begins to flow, and undergoes flow to a greater extent the closer the temperature is to the pure thermoplastic state, the greater the deformation is, and the longer the force is applied.

The inventive method can be successfully applied, as a rule, as long as the plastic at the contact surface with the tool displays at least partially elastic behavior. However, surface damage may be experienced if the tool surface contains major irregularities or the contact time between the plastic and the tool is long.

The plastic sheets or the like and tubes which are to be processed according to the invention must have a thermoelastic state region. Not all plastics have such a region; i.e., highly crosslinked thermosetting plastics are not thermoelastic when heated. Highly crystalline plastics, such as some polyamides or polyoxymethylenes, often have such a narrow temperature range between the softening temperature and the melting temperature that they are limited as candidates for thermoelastic processing, and if used they would require extremely precise temperature regulation. However, most of the industrially used plastics, e.g. most of those designated "thermoplastics", can be processed according to the inventive method. Particularly suitable are plastics with a broad thermoelastic state region; these include weakly crosslinked plastics and uncrosslinked plastics with a molecular weight above 500,000 and extending to several million (average molecular weight). Some of these plastics do not have a thermoplastic state region above the elastic region, however. If they are heated further they pass directly into the decomposition region.

The location of the thermoelastic state region is not critical, because the conditions of the method are broadly adjustable. Typical plastics for the inventive method are thermoelastic in the 80°–250° C. range. Some of the most important of these are:

(a) Molded acrylic plastics used as glass substitutes, i.e. polymethyl methacrylate, and mixed polymers of methyl methacrylate having molecular weight greater than about 500,000 and containing, e.g., acrylic esters or acrylonitrile as comonomers;

(b) Extruded acrylic glass substitutes, which differ from molded products in that they have a weight average molecular weight of less than 500,000;

(c) Cellulose ester plastics, such as cellulose acetate, cellulose acetobutyrate, cellulose propionate, or cellulose nitrate;

(d) Polyvinyl chloride;

(e) Polystyrene;

(f) Polyolefins;

and compatible mixtures of these and other suitable polymers.

Acrylic glass substitutes in sheet or plate form can be produced by casting in layer thicknesses between 1 and 30 mm. The other plastics are chiefly processed by calendering or extruding, to form film, sheet, plate, or tube shaped products. Wall thicknesses can range from 0.1 mm (film strip and tube) to about 10 mm (extruded plate or pipe). Preferred thicknesses are 0.5–8 mm. Tube diameters are as a rule 20–1000 mm. If plastics comprised of a plurality of layers are to be processed, the applicability of the inventive method depends on whether:

(i) at least the layer contacting the tool is comprised of a plastic with a thermoelastic state region, and (ii) the layer which determines the mechanical properties can undergo forming while in the thermoelastic state.

Preferred items are plastic sheets or the like or tubes with at least one high gloss surface. However, the inventive method is also advantageous in processing uniformly matted or satin-finished surfaces. The plastics may be transparent and colorless, transparent and colored, or opaquely colored.

The forming tool

The tool is comprised of a material with good thermal conductivity, which thermal conductivity should be at least an order of magnitude higher than that of the plastic. In particular, it should be greater than 2 W/cm/°C., preferably 10–250 W/cm/°C. Metals such as Al, Cu, or steel are most suitable. Press-formed materials with substantial amounts of metal fillers may also be used. Nonmetallic materials such as graphite and marble are of limited utility; and as a rule glass and ceramics are unsuitable.

The heat capacity of the forming tool must be sufficient that adequate heat can be conducted to the first surface of the plastic to maintain the surface in the thermoelastic state while the plastic is being cooled on its rear or second side. Advantageously the thickness of the forming tool should be 2–10 times that of the plastic. If the heat capacity of the tool is inadequate, the necessary heat can be delivered from a heat source such as an embedded electrical resistance heater or a channel through which a hot medium is passed.

Such a heat source may be employed to heat the tool to the necessary operating temperature; or the tool may be preheated in an oven (possibly together with the plastic which is to undergo forming).

Because the surface of the tool does not leave an impression on the plastic, the surface characteristics of the tool are not critical. In fact, a polished surface can make disengagement more difficult; on the other hand, a rough tool surface having ridges and the like can mechanically damage the plastic surface. The most advantageous type of surface is one which is ground, finely to coarsely, wherewith the grooves from the grinding can be utilized for escape of air when the tool is applied against the plastic, if the grooves are directed toward the edges.

The forming technique

The configuration of the forming tool depends in known fashion on the configuration of the plastic piece being produced, the forming technique, and the disengagement options. Preferably, the plastic is applied against the forming tool by means of excess gas pressure on one side. The pressing pressure in the case of a vacuum mold is limited to 1 kp/cm$^2$; in a blow mold it can be substantially higher, e.g. as high as 10 kp/cm$^2$. If a drawing punch is used in the forming, which punch in some cases is used merely as an adjunct to the mold in vacuum mold forming or blow mold forming, this punch may also be preheated if it is not desired for it to leave an impression.

If the plastic is undergoing mechanical forming between a positive and a negative tool, with the tools resting against respective sides of the plastic, at least one of the tools must be coolable and therefore will leave the known types of surface disturbances. In this case, the inventive forming tool will be the one which is to form the important visible side.

Preferably, the vacuum molding technique is employed. It permits ideal cooling of the free rear side by free heat radiation or preferably by blowing of cold air. If blow mold forming is employed the blown air itself must be replaced by cold air which is compressed to the required blowing pressure.

The formed part can begin to be cooled as soon as the forming which involves contact of the plastic with the tool is completed. The cooling must be continued until a sufficiently thick layer of plastic has been cooled to below the softening temperature that when the tool is disengaged the elastic restoration force of the layer which is still in the thermoelastic state can be opposed. However, the cooling must be terminated before the heat capacity of the forming tool is exhausted and the forming surface is cooled to below the softening temperature of the plastic. Cast acrylic glass substitutes are cooled on their rear sides to about 80°–100° C.; extruded acrylic glass substitutes are cooled to at least about 70°–90° C. In general there is no particular difficulty in terminating cooling at a suitable time such that the system is between the abovementioned two states.

Immediately after completion of the cooling, disengagement of the plastic from the tool is brought about. The surface of the plastic which is separated from the tool then undergoes spontaneous smoothing out by elastic restoration, wherewith this side of the formed part can be cooled immediately after disengagement.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A method of forming a plastic article having a first surface and a second surface opposing said first surface, by means of a heated forming tool, comprising the steps of:
   heating said plastic article to a thermoelastic state in a thermoelastic region of said plastic;
   contacting said first surface of said plastic article with said forming tool and forming said plastic article, said tool having a thermal conductivity at least an order of magnitude higher than the thermal conductivity of said plastic article and having a temperature which is in the thermoelastic region of the plastic;
   cooling said opposing surface of said formed plastic article below a softening temperature of the plastic until said opposing surface is shape-retentive; and then
   disengaging said first surface from the forming tool while the temperature of said tool is in said thermoelastic region.

2. The method of claim 1, wherein said forming tool is comprised of a metal material, 3. The method of claim 2, wherein said metal material is aluminum, copper, steel or a press-formed material having substantial amounts of metal filler.

4. The method of claim 1, wherein said plastic article is in the thermoelastic state and is contacted by said forming tool by applying excess gas pressure, to said plastic article.

5. The method of claim 1, wherein said plastic article has a high gloss surface.

6. The method of claim 1, wherein said plastic article is comprised of a plastic selected from the group consisting of acrylic plastics, extruded acrylic glass substitutes, cellulose ester plastics, polyvinyl chlorides, polystyrenes, polyolefins, and mixtures thereof.

7. The method of claim 6, wherein said plastic article is comprised of an acrylic glass substitute.

8. The method of claim 1, wherein said contacting step includes vacuum molding.

9. The method of claim 1, wherein said plastic article is comprised of an acrylic glass substitute and said opposing surface is cooled to about 80°–100° C. after forming with said tool.

10. The method of claim 1, wherein said plastic article is comprised of an extruded acrylic glass substitute and is cooled on the opposing surface to about 70°–90° C. after forming with said tool.

11. The method of claim 1, wherein said cooling step establishes a temperature gradient between said first surface and said opposing surface, wherein said first surface has a temperature in the thermoelastic region of said plastic and said opposing surface has a temperature below the softening temperature of the plastic.

12. The method of claim 11, wherein said first surface has a temperature in the thermoelastic region of said plastic to a depth of a few microns beneath said surface.

* * * * *